(No Model.)
C. M. CARNAHAN.
DEVICE FOR CUTTING PIPES.
No. 414,287. Patented Nov. 5, 1889.
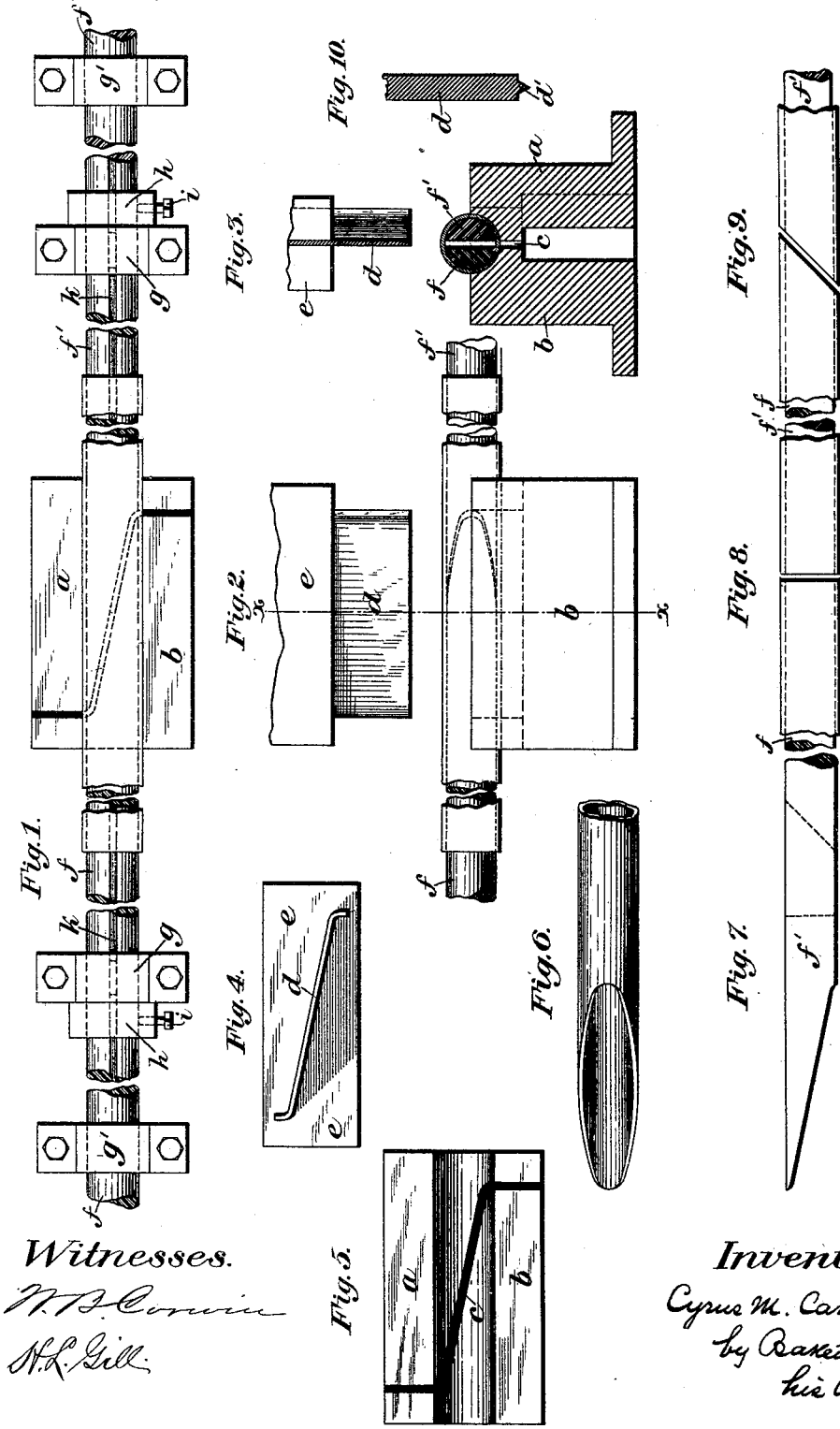
Witnesses.
W. B. Corwin
N. L. Gill.
Inventor.
Cyrus M. Carnahan
by Bakewell & Ken
his Attorneys United States Patent Office.

CYRUS M. CARNAHAN, OF PITTSBURG, ASSIGNOR OF ONE-HALF TO WILLIAM M. ORR, OF ALLEGHENY, PENNSYLVANIA.

DEVICE FOR CUTTING PIPES.

SPECIFICATION forming part of Letters Patent No. 414,287, dated November 5, 1889.

Application filed October 16, 1886. Renewed February 28, 1889. Serial No. 301,581. (No model.)

*To all whom it may concern:*

Be it known that I, CYRUS M. CARNAHAN, of Pittsburg, in the county of Allegheny and State of Pennsylvania, have invented a new and useful Improvement in Machines for Cutting Pipes; and I do hereby declare the following to be a full, clear, and exact description thereof.

The object of my invention is to provide improved means for cutting pipes with a saving of time and with simpler machinery as compared with the methods and means heretofore used.

My improvement comprises the use of mandrels, which are adapted to be inserted into the pipe, and are separated from each other at their ends, together with a knife, which is arranged to cut through the pipe and through the space between the mandrels, which during the cutting act as supports for the pipe, and as bed-knives they coact with the moving knife.

It also consists in the combination, with these elements, of bed knives or dies which support the under side of the pipe and act with the moving knife in shearing it.

It also consists in peculiar constructions of the bed-die and the moving knife.

In the accompanying drawings, Figure 1 is a plan view of the apparatus as it is when cutting a pipe. Fig. 2 is a side view of the apparatus. Fig. 3 is a vertical section on the line $x\,x$ of Fig. 2. Fig. 4 is a bottom plan view of the moving knife. Fig. 5 is a plan view of the surface of the bed-dies. Fig. 6 is a front view of a piece of pipe which has been cut by the apparatus shown in Fig. 1. Figs. 7, 8, and 9 are plan views of severals forms of mandrel adapted for use in cutting pipe on lines at different angles to its axis. Fig. 10 is a vertical sectional view of a modified form of knife.

Like symbols of reference indicate like parts in each.

The bed die or knife is shown in Fig. 5. It preferably comprises two parts $a$ and $b$, which are arranged beside each other, with their cutting-edges separated so as to afford an intermediate slot $c$ for the passage of the moving knife. The purpose of making the bed-die of the two parts $a$ and $b$ is that they may be adjusted toward and from each other. This is desirable, but is not necessary, since, if desired, the whole die may be integral in one piece with the slot $c$ formed therein. The surface of the die at the sides of the slot $c$ is made concave, and is of the proper shape to receive the pipe to be cut, which rests therein, as shown in Figs. 2 and 3. The angle of the slot $c$ with the line of the concavity conforms to the angle at which the pipe is to be cut. Thus if it is desired to cut the pipe directly across the bed-dies are shaped and set so that the slot $c$ shall cross the pipe concavity at right angles, and in the case shown in Figs. 2 and 3, where the tools are adapted to make an angling cut, the slot $c$ is made at an acute angle with the concavity extending across it.

$d$ is the moving cutter, which is mounted at the end of a vertically-reciprocating plunger $e$, directly over the slot $c$, and the knife is set at the same angle as the slot, so that it shall enter the same in its reciprocations.

$f$ and $f'$ are mandrels which are inserted within the pipe before it is cut. These are shown in Fig. 1. Each consists of a metal bar or rod preferably of about the same diameter as the bore of the pipe. The inner ends of the mandrels are of substantially the same form as the cutting-edges of the bed-dies $a$ and $b$, so that when the mandrels are inserted within the pipe and fixed in the proper positions there shall be a slot between their ends directly above the slot $c$ and of the same shape. (See Fig. 1.) The mandrels are arranged end to end horizontally and are supported by fixed frames or heads $g\,g'$, through which they pass. They are prevented from rotation within these heads by means of feathers on the inner heads $g$, fitting within sunken keyways $k$ on the mandrels.

$h$ are the collars, which are adjustably set on the mandrels by set-screws $i$, so that when the mandrels are moved lengthwise in the heads until the collars abut against the frames $g$ the ends of the mandrels shall be in the proper positions and distance from each other to register with the slot $c$, before described.

The operation is as follows: The pipe to be cut is laid upon the bed-die, and the mandrels $ff'$ are pushed forward within the ends of the pipe until the collars $h$ engage the heads $g$. The pipe is now supported on the under side by the bed-die and on the inside by the mandrels $ff'$. When the moving knife is put in motion, it cuts through the pipe, cutting the upper side in conjunction with the mandrels, whose separated ends act as supports and as stationary cutters, and cutting the under side in conjunction with the bed-die. The knife passes through the space between the mandrels and through the slot $c$, and its effect is to punch from the pipe a narrow annular strip at the angle of the knife. The cut produced is clean and regular, the pipe being prevented from breaking in by reason of the supporting-mandrels and bed-die. After this operation the cut sections of the pipe may be removed by retracting the mandrels $ff'$.

The shape of the knife and mandrels shown in Fig. 1 is such as to give the pipe-sections the peculiarly-beveled ends shown in Fig. 6, the knife $d$ being for this purpose hooked outwardly at its ends, so as to blunt both ends of the cut. Sections of pipe cut in this way are designed to be swaged into conical form for use as axle skeins or thimbles, the obliquely-cut ends being the lips by which the skeins are attached to the axles. The apparatus may be adapted to cut pipe at any angle if the angles of the moving knife and of the mandrel ends and bed-knives be suitably altered. Thus in Fig. 8 the mandrels are shown adapted for cutting pipe at right angles to its length, and in Fig. 9 the angle of the cut is somewhat oblique.

I have shown and described the use of two mandrels $f$ and $f'$, the purpose of which is to permit of cutting the pipe in the middle into sections without breaking or crushing the metal on either side of the cut; but in cases where the apparatus is used simply for trimming off the ends of pipe only one mandrel need be employed and only one of the bed-dies, though both mandrels or both bed-dies may be used, if desired.

In Fig. 10 I show a modified form of the moving knife, which is designed to prevent the knife from engaging the mandrels when it first enters the pipe. The knife is provided at its base with a beveled point or edge $d'$, which is preferably not coextensive with the blade. This edge will enter the pipe first, and will make a preliminary cut, so as to diverge the mandrels if they should be too close together and to clear the way for the entrance of the body of the knife.

I do not limit myself to any specific means for operating the tools which form part of my invention. The knife may be actuated either by steam or hand power.

I claim—

1. In a pipe-cutting machine, the combination of a mandrel arranged to fit within the pipe so as to support the same, a bed-die for supporting the pipe, and a knife arranged to cut the pipe at the end of the point of support, substantially as and for the purposes specified.

2. In a pipe-cutting machine, the combination of a parted mandrel arranged to fit within the pipe so as to support the same, and a knife arranged to cut the pipe between the separated sections of the mandrel, substantially as and for the purposes described.

3. In a pipe-cutting machine, a parted mandrel arranged to fit within the pipe with its sections somewhat separated, so as to afford a cutting-space, substantially as and for the purposes described.

4. In a pipe-cutting machine, the combination of a parted mandrel arranged to fit within the pipe so as to support the same, a slotted bed-die underlying the pipe, and a moving knife arranged to cut between the separated ends of the mandrel and through the slot of the bed-die, substantially as and for the purposes specified.

5. In a pipe-cutting-machine, the oblique cutting-knife $d$, having curved or hooked outer ends, substantially as and for the purposes described.

6. The knife $d$, having a pointed edge $d'$, substantially as and for the purposes described.

In testimony whereof I have hereunto set my hand this 13th day of October, A. D. 1886.

CYRUS M. CARNAHAN.

Witnesses:
W. B. CORWIN,
THOMAS W. BAKEWELL.